(12) United States Patent
Moorthi et al.

(10) Patent No.: US 7,836,033 B1
(45) Date of Patent: Nov. 16, 2010

(54) METHOD AND APPARATUS FOR PARALLEL UPDATES TO GLOBAL STATE IN A MULTI-PROCESSOR SYSTEM

(75) Inventors: Jay R. Moorthi, Sunnyvale, CA (US); Jonathan T. Wall, San Francisco, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 214 days.

(21) Appl. No.: 11/339,054

(22) Filed: Jan. 24, 2006

(51) Int. Cl.
*G06F 17/00* (2006.01)
*G06F 7/00* (2006.01)

(52) U.S. Cl. .............. 707/704; 707/610; 707/652; 707/966; 709/203; 709/213; 711/147

(58) Field of Classification Search .......... None
See application file for complete search history.

(56) References Cited

U.S. PATENT DOCUMENTS

| | | | | |
|---|---|---|---|---|
| 4,412,285 A | * | 10/1983 | Neches et al. | 709/252 |
| 5,584,023 A | * | 12/1996 | Hsu | 707/204 |
| 6,446,141 B1 | * | 9/2002 | Nolan et al. | 710/8 |
| 7,206,805 B1 | * | 4/2007 | McLaughlin, Jr. | 709/203 |
| 2003/0079155 A1 | * | 4/2003 | Kingsbury | 714/2 |

* cited by examiner

*Primary Examiner*—Greta L Robinson
*Assistant Examiner*—James J Wilcox
(74) *Attorney, Agent, or Firm*—Blakely, Sokoloff, Taylor & Zafman LLP (57) ABSTRACT

A method and apparatus for synchronizing updates to a large set of global counters are described. In one embodiment, the method includes making updates to a global state in response to a file system making changes to data in memory. In parallel, updates are made to a copy of the global state in a temporary buffer in response to the file system flushing the data changes to a mass storage device. The temporary buffer thus includes a set of deltas representing the changes to be made to the global state in response to the changed data in memory being pushed to the mass storage device. The method further includes merging the deltas in the temporary buffer with the global state.

18 Claims, 9 Drawing Sheets

METHOD AND APPARATUS FOR PARALLEL UPDATES TO GLOBAL STATE IN A MULTI-PROCESSOR SYSTEM

FIELD

At least one embodiment of the present invention pertains to network storage systems, and more particularly, to a method and apparatus for increasing throughput in a storage server.

BACKGROUND

Figure 1:
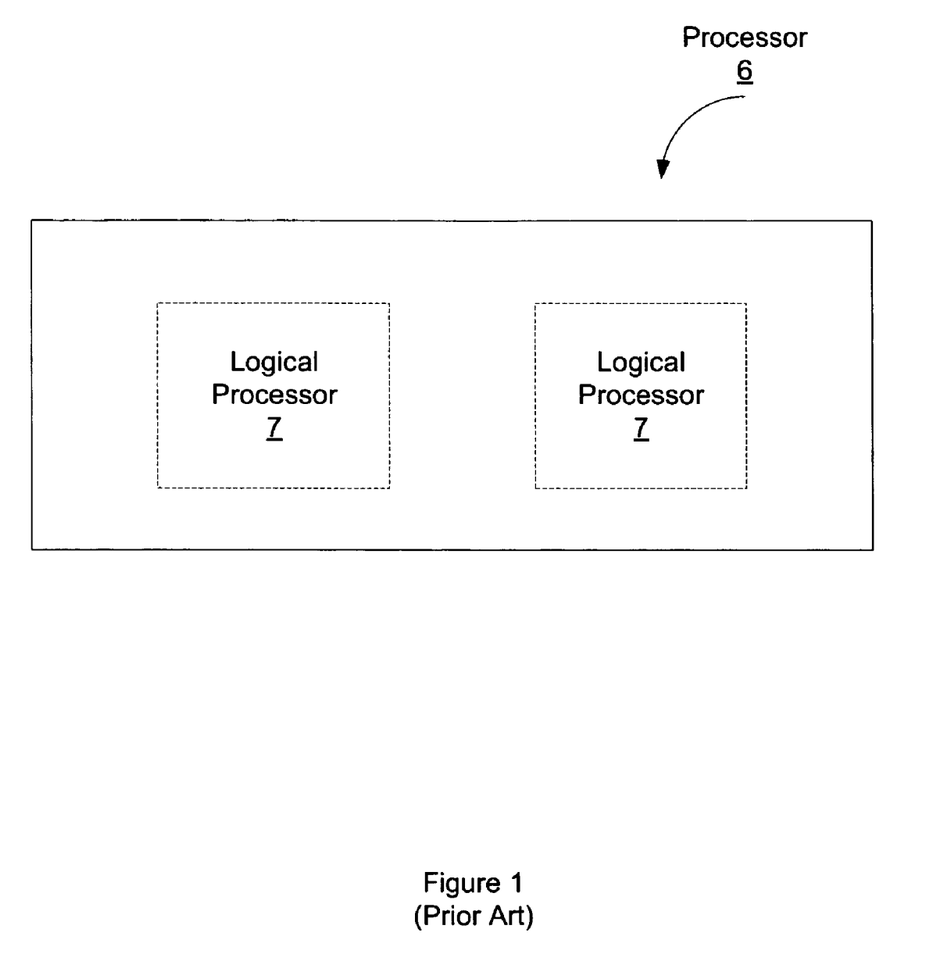
FIG. 1 illustrates a physical processor that includes multiple logical processors.

Multi-processor computing systems are becoming increasingly more common in a variety of applications. A multi-processor system is one that includes multiple processors, where the processors can be physical processors, processors with multiple cores, logical processors, or any combination thereof. A single physical processor can implement multiple logical processors, as illustrated in FIG. 1, in which one physical processor 6 includes two logical processors 7. In such an implementation, the logical processors generally have some private state, but a portion of the state is shared. The shared state is known as the global state. Accordingly, the global state is a state that is shared by a plurality of processes and/or threads running in a multi-processor environment. Henceforth in this document, the term "processor" is intended to mean either a physical processor or a logical processor unless the term is otherwise qualified.

Figure 2:
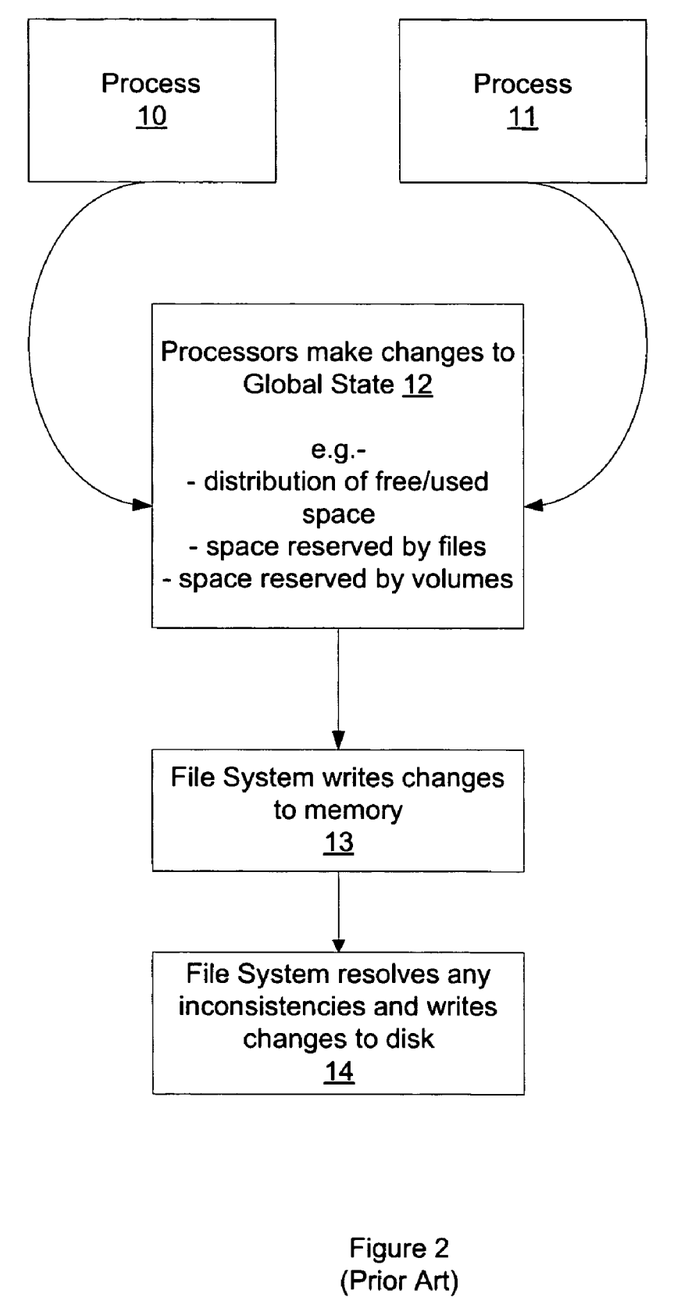
FIG. 2 is a flow diagram of a file system updating global data.

In a multi-processor environment, as illustrated in FIG. 2, multiple processes or threads 10 and 11 can execute at the same time, i.e., in parallel, and can work on a large amount of global or shared data 12. A file server typically performs two functions that update global state or counters, such as metadata. The first function is to process client operations including making changes to the global state in memory at block 13, and the second is to flush the file system changes to disk 14 upon having resolved any conflicts or inconsistencies.

Updating the global state in a parallel fashion is desirable, but cannot always be performed due to the potential for inconsistency or conflict. Parallelizing updates allows multiple units of work to happen in one unit of time. For instance, for two tasks, A, and B, that take "T" amount of time each, performing them in sequence requires 2T time, while performing them in parallel requires only T time.

One solution has been to use mutual exclusion, where both processes (client-handling and storage-handling) take a lock. A lock is a mechanism for enforcing limits on access to a resource in an environment where there are many threads of execution. A lock is thus, one way of enforcing concurrency control policies. Most locking designs block the execution of the process requesting the lock until it is allowed to access the locked resource. Locks can be efficient if the execution of the process is only likely to be blocked for a short period of time, as it avoids the overhead of operating system process re-scheduling. However, locks are wasteful if the lock is held for a long period of time. In this case, locks lead to a lot of contention, which is measured by the amount of work that cannot be done during the wait.

One solution to the problem of parallelizing updates to global state is to determine all global state updates, and take individual locks for each global counter that is to be updated. However, more locks means more complexity, more code updating, more bugs, also creates overhead of process scheduling (figuring out which process takes which lock, etc.)

SUMMARY OF THE INVENTION

The present invention includes methods and related apparatus for synchronizing updates to a large set of global counters. In one embodiment, the method includes making updates to a global state in response to a file system making changes to data in memory. In parallel, updates are made to a copy of the global state in a temporary buffer in response to the file system flushing the data changes to a mass storage device. The temporary buffer thus includes a set of deltas representing the changes to be made to the global state in response to the changed data in memory being pushed to the mass storage device. The method further includes merging the deltas in the temporary buffer with the global state.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for increasing throughput in a storage server are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

To solve the problems noted above, the technique introduced here parallelizes updates to global data made by a file system when changes are made to data stored by the file system (termed the "client-handling changes" herein) and when the client-handling changes are pushed to disk (termed the "storage-handling changes" herein). However, this is done so as not to allow two or more potentially conflicting updates to operate on the same global data at the same time.

According to certain embodiments of the present invention, only one of the two update processes (the update process due to the client-handling changes and the update process due to the storage-handling changes) is changed to accomplish parallelizing updates to global data. According to certain embodiments of the present invention, while the client-handling update process is performed as before, the storage-handling update process is changed. Accordingly, updating the global counters or state corresponding to the file system making changes to data in memory (the client-handling changes) stays the same. Updates to global counters or state corresponding to the file system part that pushes changes to disk (the storage-handling) are executed in parallel by making updates to a copy of global data in a temporary buffer region.

According to certain embodiments, updates to a copy of global data are accomplished by allocating a temporary buffer to each message. A message is a way of organizing processing. A message is a work item that a system needs to process. A message typically consists of an operation type and data associated with a specific invocation of that operation type, and information to uniquely determine this invocation from any other invocation. Other ways of organizing processing include threads, events, etc. To 'send the message' means to 'call a function' where the message can make updates to a copy of global data. The temporary buffer is private to the message, so as long as a message executes serially with respect to itself, no explicit locking is required for each update. Accordingly, if a single message runs on its own temporary buffer, it does not need to worry about anything executing in parallel conflicting with its updates to the temporary buffer. Once a message completes execution, the temporary buffer contains a set of deltas that represent the changes the message would have made to the global state. As temporary buffers move into a final state, the deltas they contain can be serially merged into the global state without domain synchronization.

The techniques introduced here effectively allow updates to global states due to the client-handling changes and the storage-handling changes to run in parallel, without the need for frequent, low-level synchronization operations. The technique effectively performs updates to global states in such a way as to reduce or eliminate the need for explicit locking of buffers and auxiliary data structure, with very little disturbance of existing code.

Figure 3:
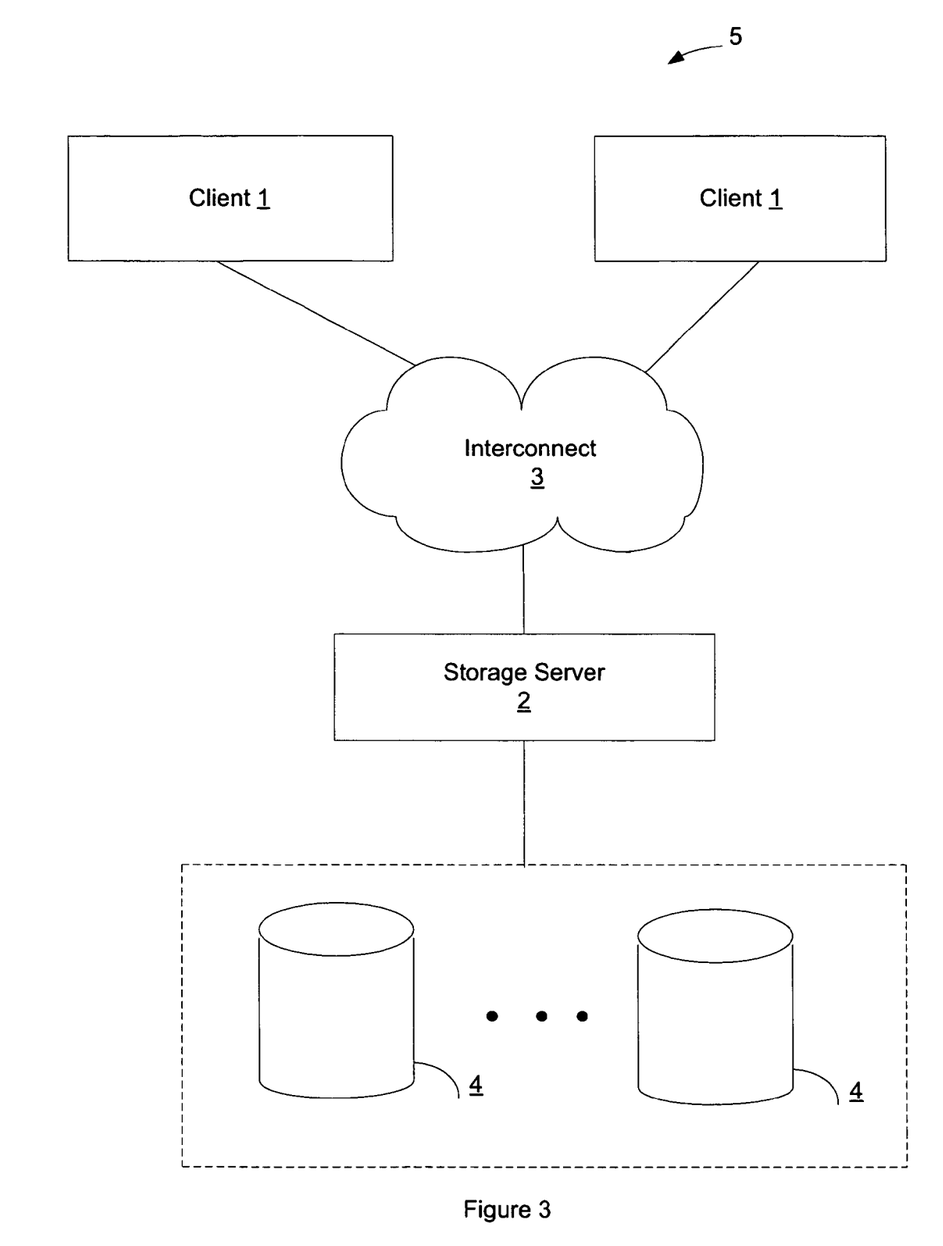
FIG. 3 illustrates a network environment that includes a storage server and clients.

FIG. 3 illustrates an example of a network environment 5 in which this technique can be implemented. Although the example of FIG. 3 is a networked storage system, the invention can also be implemented in any of various other types of environments, e.g., not necessarily in a storage system. The system 5 of FIG. 3 includes a storage server 2 coupled locally to a set of mass storage devices 4, and to a set of clients 1 through an interconnect 3. Note, however, that the storage system may be implemented in computer systems that do not have a client-server architecture, such as peer-to-peer computer systems.

The storage server 2 receives various read and write requests from the clients 1 and accesses the mass storage devices 4 to service those requests. When changes to data stored by the storage server 2 are requested by clients 1, the storage server 2 performs changes to data in memory and then pushes the changes to data stored in the mass storage devices 4. Each of the clients 1 may be, for example, a conventional personal computer (PC), workstation, or the like. The mass storage devices 4 may be, for example, conventional magnetic tapes or disks, optical disks such as CD-ROM or DVD based storage, magneto-optical (MO) storage, or any other type of non-volatile storage devices suitable for storing large quantities of data, or a combination thereof. The mass storage devices 4 may be organized into one or more volumes of Redundant Array of Independent Disks (RAID).

The storage server 2 may be, for example, a file server, or "filer", such as may be used in a network attached storage (NAS) environment. Alternatively, the storage server may provide clients with block-level access to stored data, such as in a storage area network (SAN) environment. Or, the storage server 2 may be capable of operating in both modes. The storage server 2 can implement one or more of various different protocols, such as common Internet file system (CIFS), network file system (NFS), hypertext transport protocol (HTTP), simple network management protocol (SNMP), transfer control protocol/Internet protocol (TCP/IP), etc., and can selectively use these protocols as needed.

In a NAS implementation, the interconnect 3 may be essentially any type of computer network, such as a local area network (LAN), a wide area network (WAN), metropolitan area network (MAN) or the Internet, and may implement the Internet Protocol (IP). In a SAN implementation, the interconnect 3 may be, for example, a Fibre Channel switching fabric which implements the Fibre Channel Protocol (FCP).

Figure 4:
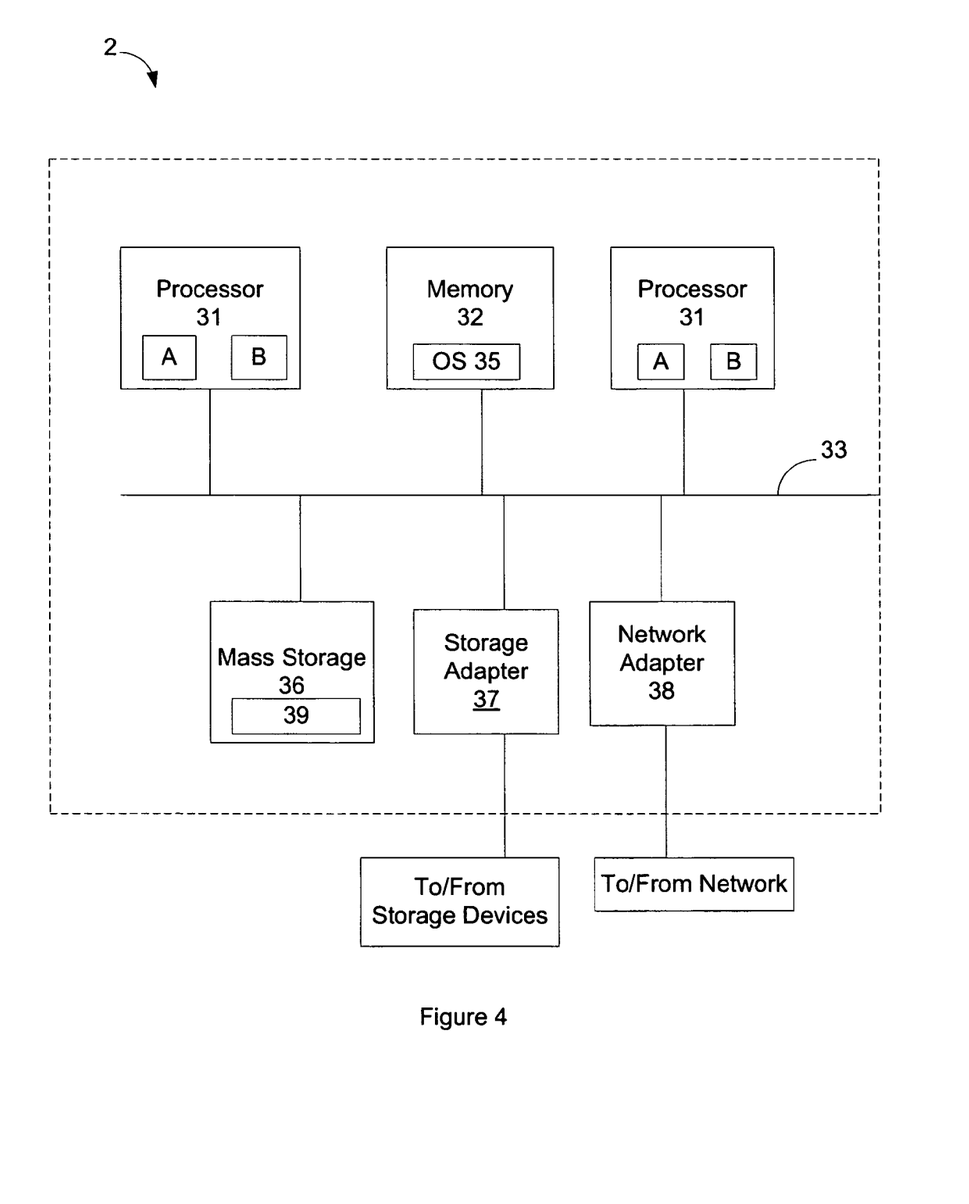
FIG. 4 is a block diagram of a storage server.

FIG. 4 is a high-level block diagram of the storage server 2 of FIG. 3, which can implement embodiments of the invention. Certain standard and well-known components which are not germane to the present invention are not shown. The storage server 2 in the illustrated embodiment is a multi-processor system, in that it includes two physical processors 31 coupled to a bus system 33. Each of the physical processors 31 may implement two logical processors 34. As shown in FIG. 4, one physical processor 31 includes logical processors A and B, while the other physical processor 31 includes logical processors C and D. Note that in other embodiments the storage server 2 may include a number of physical processors other than two, and/or each physical processor may include a number of logical processors other than two.

The bus system 33 is an abstraction that represents any one or more separate physical buses and/or point-to-point connections, connected by appropriate bridges, adapters and/or controllers. The bus system 33, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The physical processors 31 are the central processing units (CPUs) of the storage server 2 and, thus, control the overall operation of the storage server 2. In certain embodiments, the physical processors 31 accomplish this by executing software stored in memory 32. A physical processor 31 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The storage server 2 also includes memory 32 coupled to the bus system 43. The memory 32 represents any form of random access memory (RAM), read-only memory (ROM), flash memory, or a combination thereof. Memory 32 stores, among other things, the operating system 35 of the storage server 2, in which the techniques introduced here can be implemented.

Also connected to the processors 31 through the bus system 33 are a mass storage device 36, a storage adapter 37, and a network adapter 38. Mass storage device 36 may be or include any conventional medium for storing large quantities of data in a non-volatile manner, such as one or more disks. The storage adapter 37 allows the storage server 2 to access the external mass storage devices 4 and may be, for example, a Fibre Channel adapter or a SCSI adapter. The network adapter 38 provides the storage server 2 with the ability to communicate with remote devices such as the clients 1 over a network and may be, for example, an Ethernet adapter or a Fibre Channel adapter.

Memory 32 and mass storage device 36 store software instructions and/or data 35 and 39, which may include instructions and/or data used to implement the techniques introduced here. These instructions and/or data may be implemented as part of the operating system 35 of the storage server 2.

Figure 5:
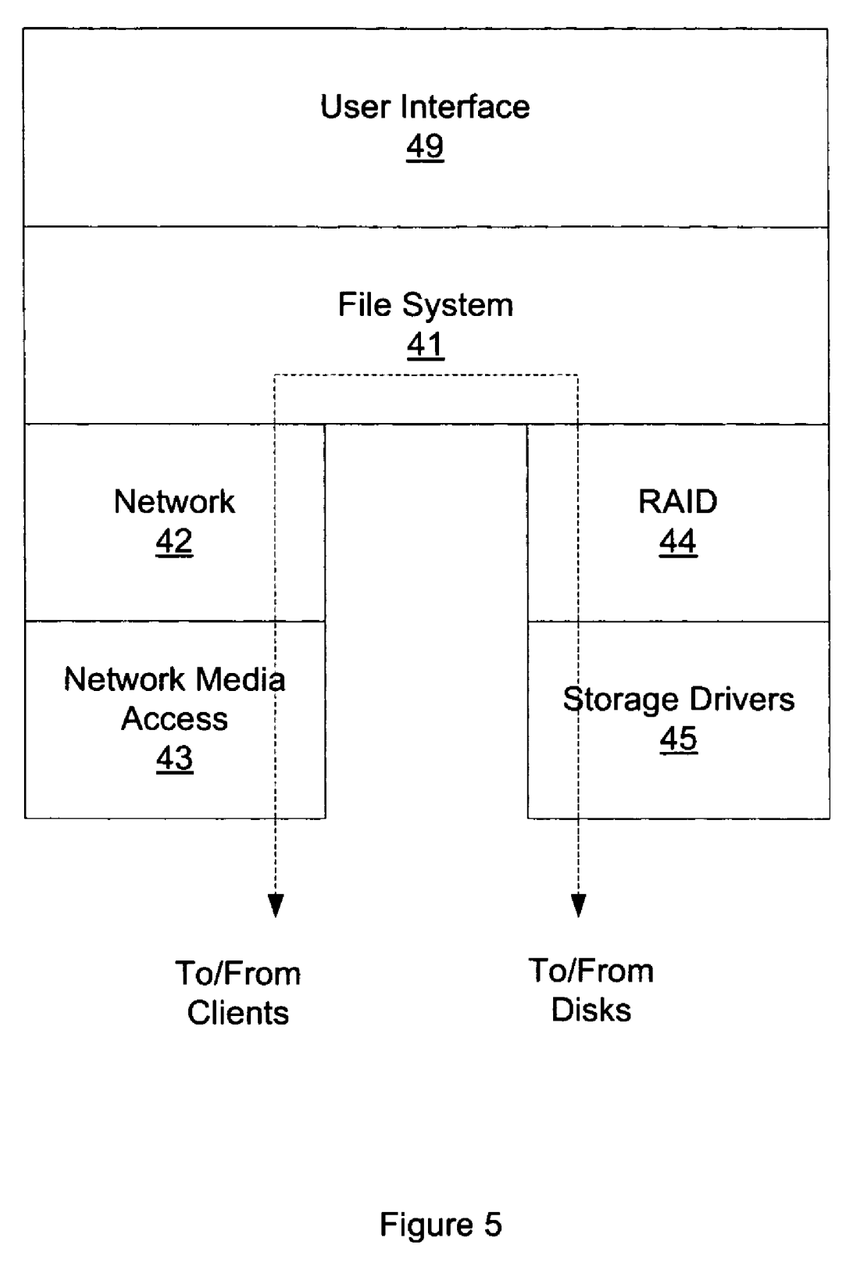
FIG. 5 illustrates the operating system of a storage server.

A shown in FIG. 5, the operating system 35 of the storage server 2 includes several modules, or layers. These layers include a file system 41. The file system 41 is an application-level programmatic entity which imposes a structure (e.g. hierarchical) on files, directories and/or other data containers stored and/or managed by a storage server, and which services read/write requests from clients of the storage server. The file system 41 contains three portions—management, client-handling and storage-handling. The client-handling portion performs client operations processing and the resulting data changes in memory. The storage-handling portion flushes data changes in memory to a mass storage device, such as disk. The management portion performs updates to global state due to the data changes in memory and the data changes being flushed to disk. An example of such a file system is the Write Anywhere File Layout (WAFL®) file system, which is part of the Data ONTAP® operating system used in Filers made by Network Appliance, Inc. (NetApp®) of Sunnyvale, Calif.

Logically under the file system 41, the operating system 35 also includes a network layer 42 and an associated network media access layer 43, to allow the storage server to communicate over a network (e.g., with clients 1). The network layer 42 may implement one or more of various protocols, such as NFS, CIFS, HTTP, SNMP, and TCP/IP. The network media access layer 43 includes one or more drivers which implement one or more protocols to communicate over the network 3, such as Ethernet or Fibre Channel. Also logically under the file system 41, the operating system 35 includes a RAID layer 44 and an associated storage driver layer 45, to allow the storage server 2 to communicate with external mass storage devices 4. The RAID layer 44 implements a RAID protocol, such as RAID-4 or RAID-5, while the storage driver layer 45 implements a lower-level storage device access protocol, such as Fibre Channel or SCSI. The operating system 35 may also include a user interface layer 49, which implements a graphical user interface (GUI) and/or a command line interface (CLI), for example, such as for purposes of administrative access to the storage server 2.

Figure 6:
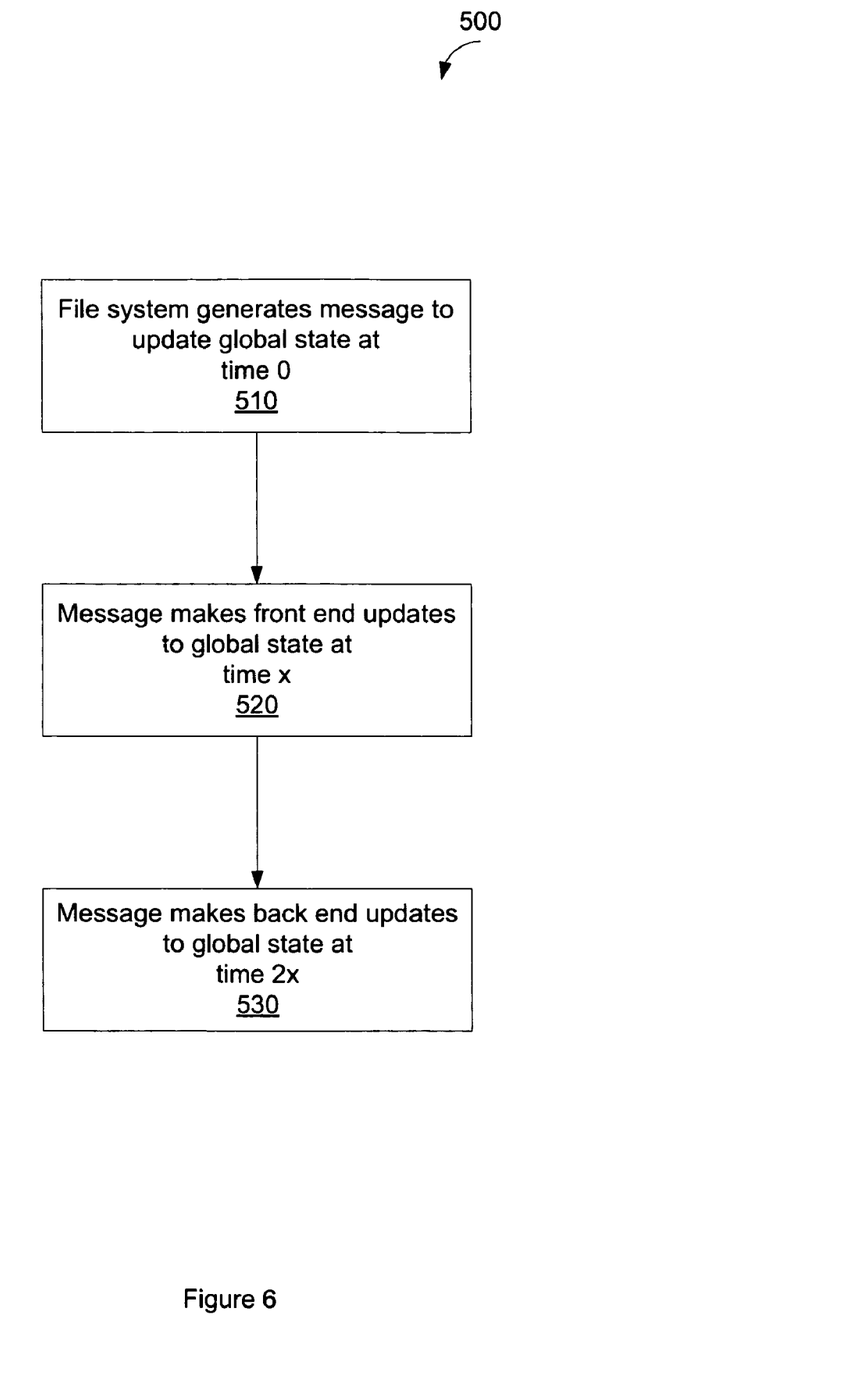
FIG. 6 is a flow diagram showing a process of serial updating.

FIG. 6 illustrates a process 500 of serial updating of global state. At block 510, the file system 41 generates a message to update the global state with updates due to both the client-handling changes and the storage-handling changes in the file system. This message is generated at time t=0. At block 520, the execution of the message results in changes to the global state due to the client-handling changes to the file system. This update takes "x" amount of time, and is therefore completed at time t=x. At block 530, the message makes the updates to the global state due to the storage-handling changes to global state. This update also takes "x" amount of time and is therefore completed at time t=2x. Therefore, the process takes 2 times x amount of time to update the global state due to the file system 41 changing data in memory and pushing the changes to disk.

Figure 7:
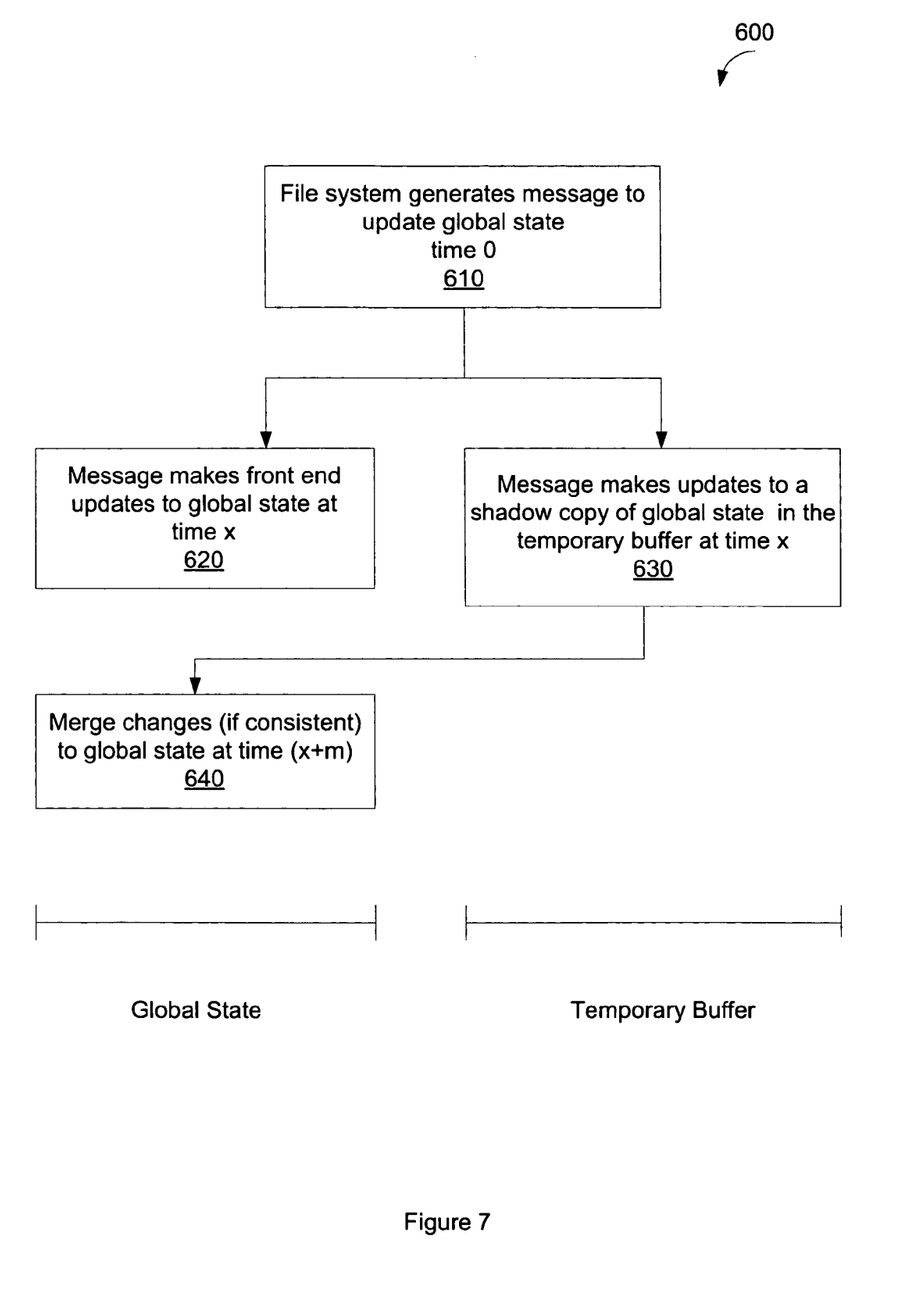
FIG. 7 is a flow diagram showing a process of parallel updating in accordance with certain embodiments of the invention.

FIG. 7 illustrates a process 600 of updating global state according to certain embodiments of the present invention. As shown in process 600, only one of the two update processes (the client-handling update process and the storage-handling update process) needs to be changed to accomplish parallelizing updates to global data. While the process 600 shows changing the storage-handling update process, in other embodiments, the client-handling process could be changed instead. In either situation, the three portions of file system 41 (management, client-handling, and storage-handling) are running in parallel.

At block 610, the file system 41 generates a message to update the global state with updates due to both the client-handling changes and the storage-handling changes. This message is generated at time t=0. At block 620, the execution of the message results in the client-handling updates to global state. This update takes "x" amount of time, and is therefore completed at time t=x. In parallel, at block 630, the message makes storage-handling updates to a copy of the global data in the temporary buffer. This update takes about "x" amount of time. The temporary buffer is private to the message, so as long a message executes serially with respect to itself, no explicit locking is required for each update. Once the message completes execution, the temporary buffer contains a set of deltas that represents the changes the message would have made to the global state. At block 640, the deltas contained in the temporary buffer are serially merged into the global state. In certain embodiments, the deltas are merged only if the changes are consistent. Merging deltas is the process of applying the changes contained in the temporary buffer to the global state. The temporary buffer contains sufficient information on each change contained within it to allow the merge process to determine the corresponding piece of global data for each delta in the temporary buffer. According to certain embodiments of the invention, implicit data about the global state is maintained by using the same data structure in the temporary buffer as in the global data.

The processing at block 640 is completed in "m" amount of time, at time t=(x+m). Because the processing involved in merging the updates to the global state (block 640) is very small relative to the processing involved in making updates to the copy of the global data in the temporary buffer (block 630), m is much smaller than x.

The updates to the global state due to the client-handling changes and the updates to the copy of the global state due to the storage-handling changes are made simultaneously, i.e., in parallel. Both updates finish in about the same amount of time, for instance in "x" amount of time. Therefore, at time t=x, the file system 41 has finished making updates to the global data due to the client-handling changes and making updates to a copy of the global data due to the storage-handling changes. At time t=(x+m), the file system 41 has finished merging the storage-handling updates to the global state. In this way, the process 600 performs (2x+m) work in (x+m) time, where the process 500 (shown in FIG. 6) performs (2x) work in (2x) time. The processing performed in block 640 represents overhead in the system, but the overhead is very small. Because time "m" is very small relative to "x", the client-handling and the storage-handling updates to the global state are effectively conducted in parallel.

Process 600 describes a mechanism for synchronizing updates to a large set of global counters to achieve a high degree of parallelism with very little disturbance to existing code. It also avoids taking a lock every time a global counter is updated and avoids problems associated with multiple locks. In certain embodiments, process 600 is implemented under the protection of a domain lock. In a multi-processor environment, to ensure that instructions and data are safe for execution, the various processes implemented by the operating system can be organized into a number of mutual exclusion groupings or domains according to their functionality. A domain is a way to implement Coarse-grained Symmetric Multi Processing ("CSMP"). It is a static partition of code and data such that code within a domain is guaranteed to never run in parallel with other code in the same domain. Therefore, no synchronization overhead is imposed. There is a limit to the amount of parallel work that can be done. Since code in a domain cannot run in parallel with itself, the maximum amount of work that can be done in a single domain in a given unit of time is amount of work that can be done by a single CPU in that unit of time. Accordingly, every process capable of execution by the processing device is assigned to exactly one domain.

Referring to FIG. 7, in certain embodiments, steps 620 and 640 are carried out under protection of a domain lock, so that the global state is not modified by an unwanted process. Also, because the application of the deltas to the appropriate global counter occurs serialized by the domain lock, explicit locking remains unnecessary.

In certain embodiments, to implement process 600, a temporary buffer is embedded in the message. The temporary buffer is a memory buffer that is private to a specific message in which to stage changes that need to be made to global state. The changes are referred to as deltas. According to certain embodiments of the invention, the temporary buffer is implemented as a portion of memory assigned to a message. For instance, the message can be a data type "struct", and the temporary buffer a field within the message struct. The temporary buffer is itself a data type "struct" which determines the size and logical structure of its memory buffer. The temporary buffer struct can either be contained by the message struct or the message struct can hold a pointer to the temporary buffer. The temporary buffer is used to store a set of changes made by a message (e.g., at block 630).

An inode is a data structure used to store information, such as meta-data, about a file, and the data blocks are structures used to store the actual data for the file. The information contained in an inode may include, e.g., ownership of the file, access permission for the file, size of the file, file type and references to locations on disk of the data blocks for the file. A volume typically refers to a single file system, which may be composed of a collection of disk drives. Disk storage is typically implemented as one or more storage "volumes" that comprise physical storage disks, defining an overall logical arrangement of storage space.

Using the same structure in the temporary buffer and the global data in, for instance, the storage volume, is useful in that update functions can work in terms of accounting structures and need not be aware of the temporary buffer or the volume. Also, when the temporary buffer is merged into global state, the mapping of fields in the temporary buffer to fields in the global state can be performed without too much translation. In this way, using the same structures with the same field names makes it easy to determine which delta fields apply to which global state fields.

There are two sets of deltas and two sets of global state fields for each inode that is cleaned, those for the virtual volume and those for its parent aggregate, which is a container for multiple volumes. Process 600 can be used to update global state fields for a virtual volume and its parent aggregate. This requires separately tracking in the temporary buffer fields that both virtual volumes and aggregates will have, fields that are unique to virtual volumes, and fields that are unique to aggregates. To update a virtual volume and its aggregate, the temporary buffer contains a structure of changes for every piece of data it needs to update.

In certain embodiments, temporary buffers are stored for some amount of time after they have been merged into global state. Accordingly, the global state can be rolled back to a point-in-time "snapshot" corresponding to the update made before or after a particular message. The term "snapshot" is used herein as shorthand to mean a read-only, persistent, point-in-time image of a set of data. The term "snapshot" is used herein without derogation of the trademark rights of Network Appliance, Inc.

Further, in certain embodiments, a temporary buffer can be tagged with metadata about the temporary buffer, such as the message type, message count, processor, and inode that generated it, thus making it possible to isolate several streams of updates and step through changes. This type of transaction history information is useful in debugging and can also be used for performance profiling and tuning purposes.

Figure 8:
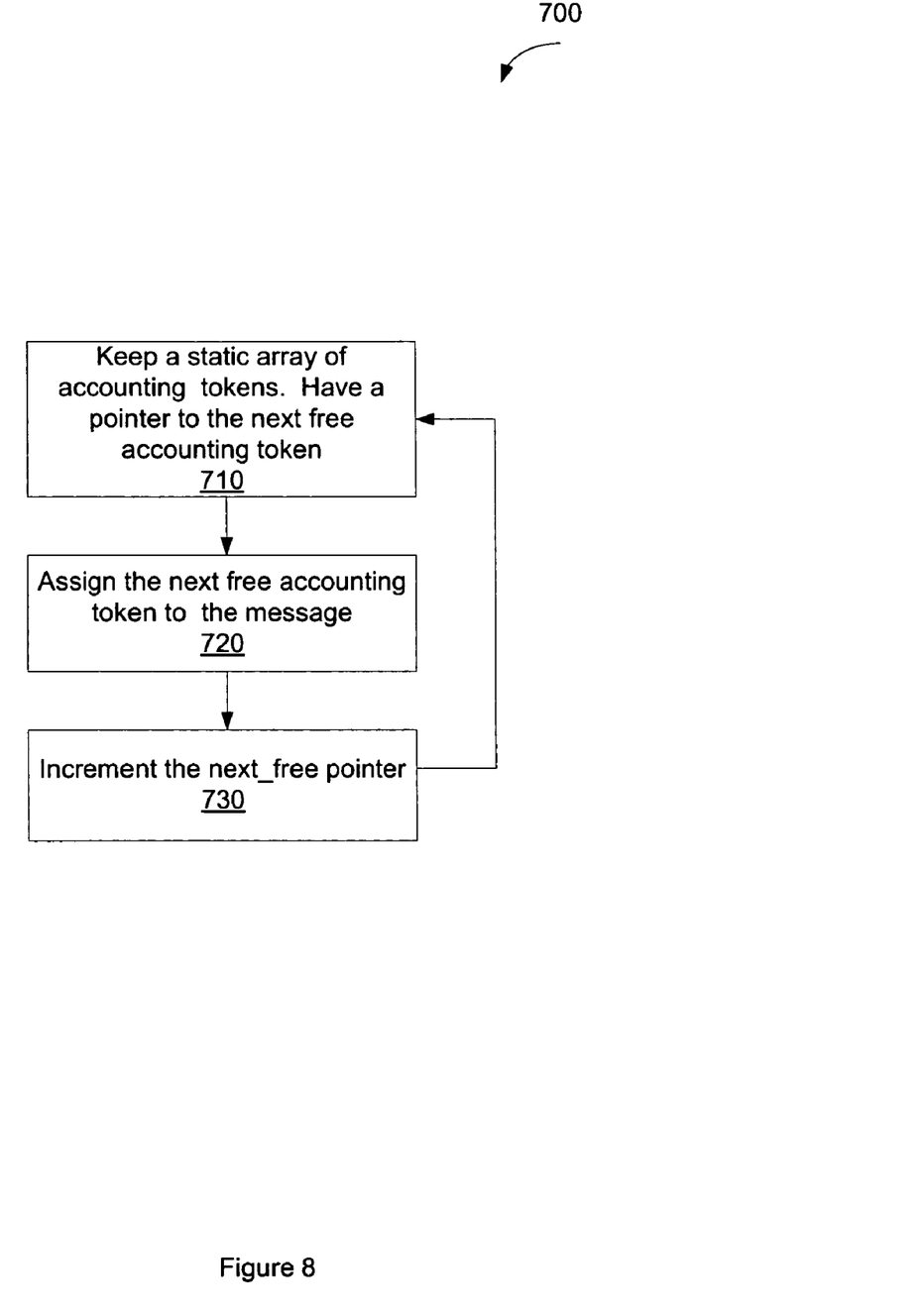
FIG. 8 is a flow diagram showing a process of implementing a transaction history in accordance with certain embodiments of the invention.

FIG. 8 illustrates a flow diagram of a process 700 of implementing a transaction history. At block 710, a static array of temporary buffers is defined, and a pointer (the "next_free pointer") to the next free temporary buffer is assigned. At block 720, when a message needs an temporary buffer to hold its updates, the next free temporary buffer is assigned to the message, and the next_free pointer is incremented at block 730, wrapping as it reaches the end. This wrapped array order provides the sequence of temporary buffers. The size of the array can be used to control the amount of history available.

Figure 9:
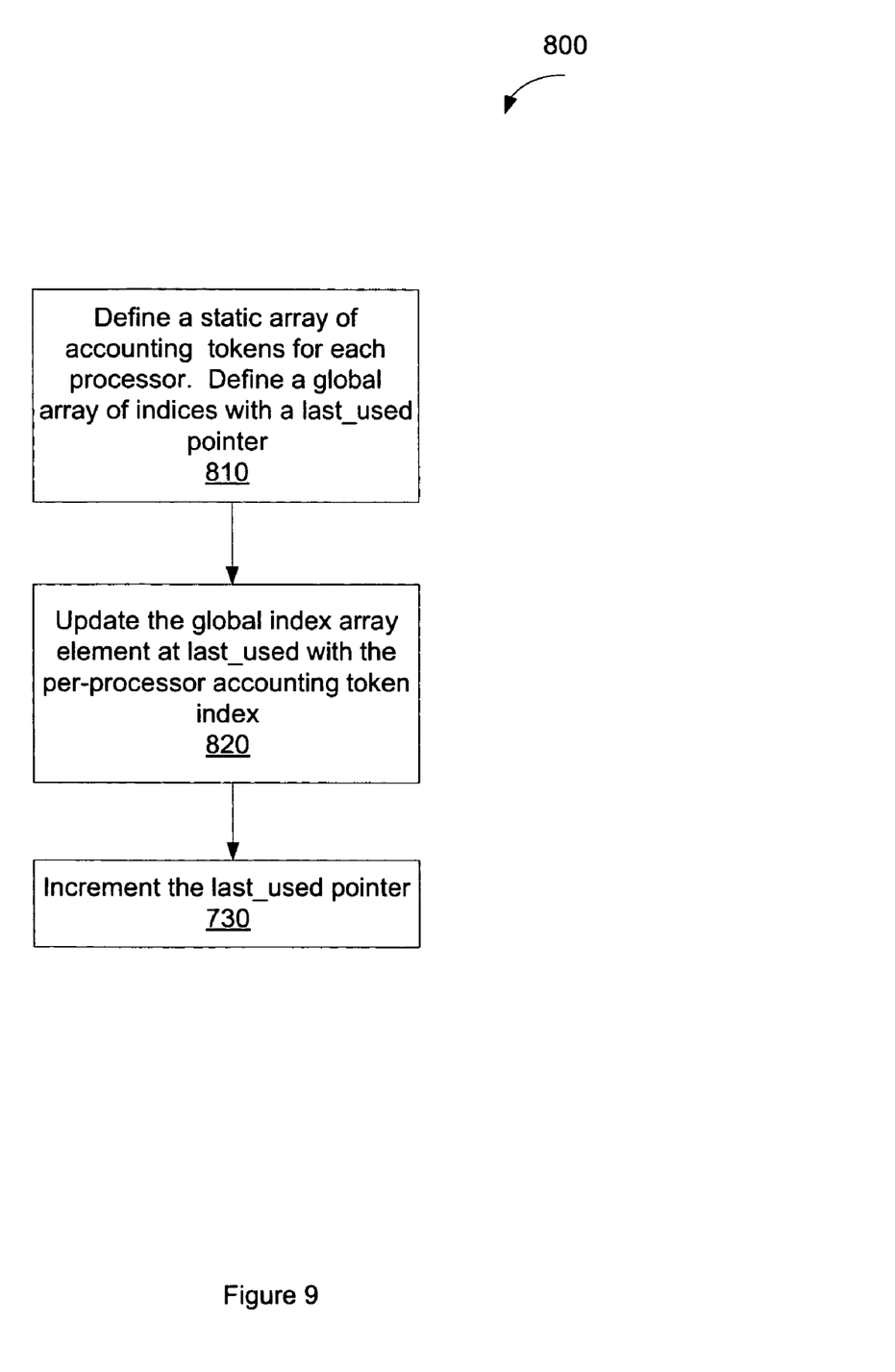
FIG. 9 is a flow diagram showing a process of implementing a transaction history in accordance with certain embodiments of the invention.

FIG. 9 is a flow diagram of a process 800 of implementing a transaction history. In certain embodiments, process 800 can be implemented if the global next_free pointer produces too much contention. At block 810, a static array of temporary buffers can be defined for each processor. A larger, global array of indices can be maintained with a last_used pointer. At block 820, when an temporary buffer is merged (e.g., at block 640), the global index array element at last_used is updated with the per-processor temporary buffer index and last_used pointer incremented at block 830.

In certain embodiments, the file system 41 does not need synchronization to make updates to global state. For instance, the file system 41 may not need synchronization to make updates to global state when the storage server 2 is running single-processor. Performing the final merge in this case constitutes overhead. Also, internal consistency verification sometimes depends on checking authoritative global state, not a set of deltas. For example, making sure that a global counter does not overflow some boundary only makes sense when updates to the counter are serial. In these and possibly in other cases, the file system 41 may maintain the ability to run with or without process 600. This means that when a function executes, the file system 41 determines whether to update an temporary buffer or to directly update the global state. Accordingly, in certain embodiments, accounting updates can follow a prepare, lock, update, finish, unlock pattern, where preparation involves deciding whether an update is destined for a private token or global state, locking (e.g., a domain lock) occurs as necessary, and the update is independent of the target being private or global.

Thus, a method and apparatus for increasing throughput in a storage server have been described. Note that the technique introduced here could alternatively be applied in a processing device other than a storage server. As just one example, this technique could easily be modified for implementation in a networking device (e.g., a switch, router or gateway). Furthermore, the principles described above are not necessarily limited in application to a single (multi-processor) processing device. That is, it is possible to apply the principles described above to a distributed system, to facilitate two or more processing devices (e.g., two or more storage servers, each of which includes one or more processors) safely having access to the same data.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A computer-implemented method of updating a global state by a multi-processor storage server, the method comprising:
   generating a message to update the global state, wherein the global state is a state that is shared by a plurality of processes or threads running in the multi-processor storage server and wherein the global state corresponds to storage space managed by the storage server;
   creating, by the multi-processor storage server, a copy of the global state in a private temporary buffer;
   updating the global state after creating the copy of the global state, wherein the updating of the global state includes the message making front end updates to the global state, wherein the front end updates correspond to data changes in memory due to handling of client operations, and wherein the updating the global state is performed inside protection of a domain lock;
   updating the copy of the global state in parallel with the updating of the global state, wherein the updating of the copy of the global state includes the message making updates that correspond to pushing the data changes in the memory to a mass storage device, and wherein the updating the copy of the global state is performed in the private temporary buffer and without protection of a lock; and
   merging changes from the private temporary buffer into the global state, wherein the merging is performed inside the protection of the domain lock and after completing the updating of the global state and the copy of the global state.

2. A method as recited in claim 1, wherein the private temporary buffer comprises a set of deltas representing the changes to be made to the global state corresponding to changes made to the changed data in memory pushed to the mass storage device.

3. A method as recited in claim 2, wherein the merging the updates includes merging the deltas in the private temporary buffer with the global state.

4. A method as recited in claim 3, further comprising:
   storing a plurality of private temporary buffers.

5. A method as recited in claim 4, further comprising:
   tagging the plurality of private temporary buffers with metadata.

6. A method as recited in claim 1, wherein the private temporary buffer comprises a data structure that comprises accounting structures of an inode.

7. A method as recited in claim 2, wherein each delta to be merged using domain synchronization.

8. A storage server comprising:
   a plurality of processors;
   a communication interface through which to communicate with a set of clients;
   a storage interface through which to communicate with a storage subsystem containing data stored by the storage server on behalf of the clients; and
   logic which causes the storage server to
      generate a message to update a global state, wherein the global state is a state that is shared by a plurality of processes or threads running in the multi-processor storage server and wherein the global state corresponds to storage space managed by the storage server;
      allocate a private temporary buffer region to the message to update global data used by parallel processes, wherein the global data corresponds to storage space managed by the storage server;
      make updates to the global data after completing the allocation of the private temporary buffer, wherein the updates to the global data include the message making front end updates to the global state, wherein the front end updates correspond to changes made to data in memory and wherein the updates are performed inside protection of a domain lock;
      in parallel to updates to the global data corresponding to changes made to data in memory, make updates to a copy of the global data in the private temporary buffer without protection of a lock, wherein the updates to the copy of the global data include the message making updates that correspond to the changed data being pushed to the storage subsystem; and
      merge changes from the private temporary buffer into the global data after completing the updating of the global data and the copy of the global data, wherein the merging is performed inside the protection of the domain lock.

9. A storage server as recited in claim 8, wherein the private temporary buffer comprises a set of deltas representing the changes to be made to the global state corresponding to changes made to the changed data in memory being flushed to the mass storage device.

10. A storage server as recited in claim 9, wherein the logic which causes the storage server to merge the updates includes logic which causes the storage server to merge the deltas in the private temporary buffer with the global state.

11. A storage server as recited in claim 10, wherein the global state is a state that is shared by a plurality of processes running in a multi-processor environment.

12. A storage server as recited in claim 11, wherein the multi-processor environment is implemented within a storage server.

13. A storage server as recited in claim 10, further comprising logic which causes the storage server to:
    store a series of private temporary buffers.

14. A storage server as recited in claim 10, further comprising logic which causes the storage server to:
    tag the private temporary buffer with metadata regarding the private temporary buffer.

15. A storage server as recited in claim 8, wherein the private temporary buffer comprises a data structure defined to contain same accounting structures as an inode.

16. A storage server as recited in claim 11, wherein each delta to be merged without explicit locking.

17. The method recited in claim 1, wherein the time taken to merge the set of changes to the updated global state is very small relative to the time taken to update the copy of the global state corresponding to data changes being flushed to a mass storage device.

18. The method of claim 1, wherein making an update to the global state comprises modifying metadata in a set of global counters.

* * * * *